UNITED STATES PATENT OFFICE.

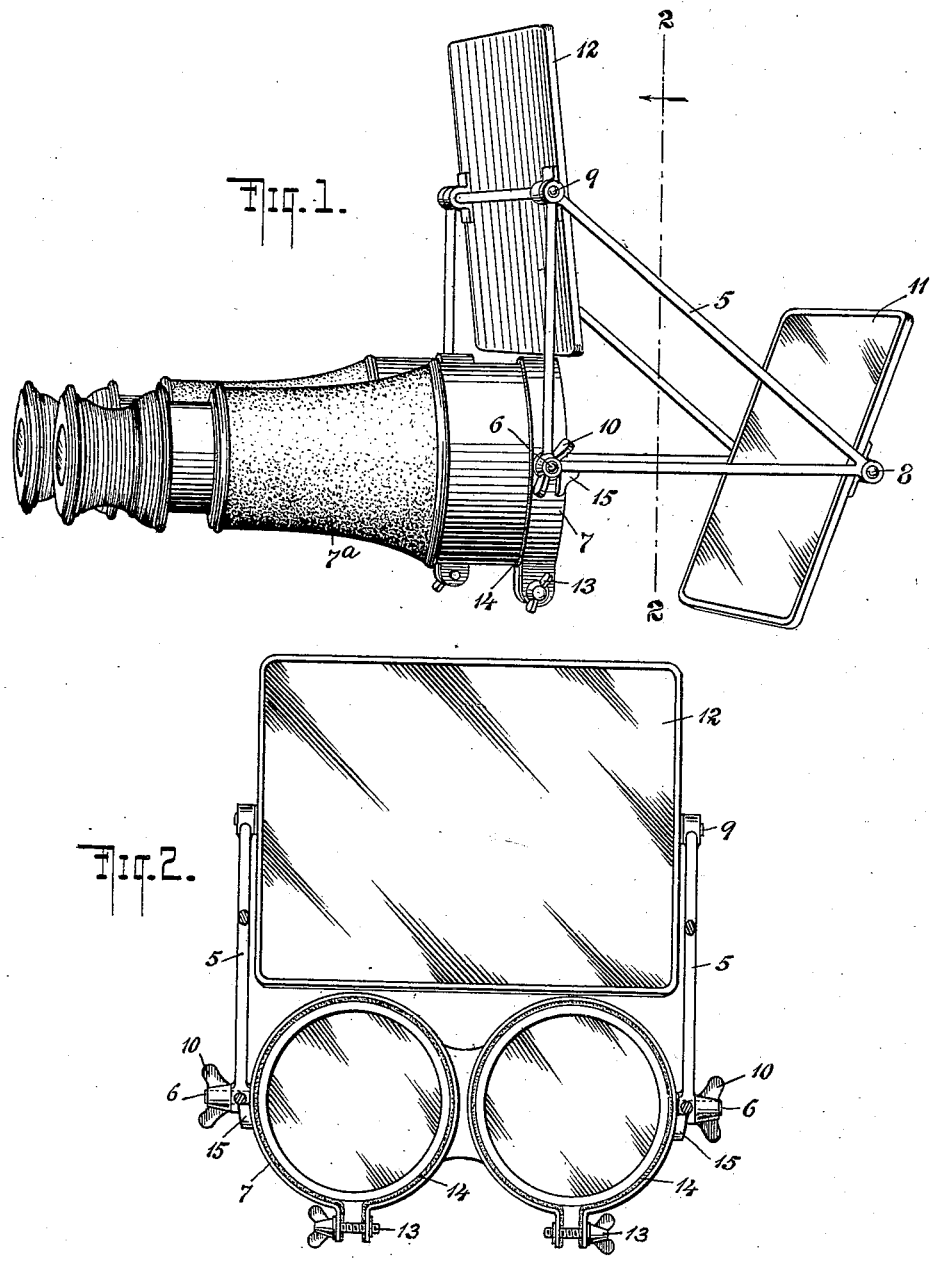

LAWRENCE ABRAHAM, OF NEW YORK, N. Y.

ATTACHMENT FOR OPTICAL INSTRUMENTS.

991,591. Specification of Letters Patent. Patented May 9, 1911.

Application filed November 16, 1910. Serial No. 592,635.

*To all whom it may concern:*

Be it known that I, LAWRENCE ABRAHAM, a citizen of the United States, and resident of the borough of Brooklyn, county of Kings, city and State of New York, have invented certain new and useful Improvements in Attachments for Optical Instruments, of which the following is a specification.

My invention relates to optical instruments such as telescopes, binocular telescopes, field glasses, opera glasses and the like and has for its object to provide such instruments with an attachment by means of which elevated or distant objects may be viewed through the particular instrument being used without making it necessary to raise said instrument into line with the object under observation. Heretofore, particularly in the viewing of aerial flights, it has been necessary for the observer to assume an uncomfortable position to at all times retain the air ships, balloon, or aeroplane within the line of vision. The particular purpose of my improvement is to overcome this objection and to make it possible for the observer in a normal position to view the object.

My invention will be fully described hereinafter and the features of novelty will be pointed out in the appended claims.

In the drawings in which I have shown my attachment applied to a field glass, Figure 1 represents a perspective view of my improvement in operative position and Fig. 2 is a front elevation thereof.

My particular device comprises preferably triangular frames 5 each pivotally mounted at 6 on collars 7 and maintained in spaced relation to each other by means of cross bars 8 and 9. Thumb screws 10 coöperating with the screw threaded pivots 6 are preferably provided for maintaining said frames in any adjusted position. Mirrors 11 and 12 are mounted to swing respectively on the cross bars 8 and 9 and have their reflecting surfaces facing each other. The mountings of those mirrors each preferably frictionally engage the respective bars 8 and 9, so that said mirrors will remain at any degree of inclination to which they may be swung. The collars 7 are adapted to be secured to the objective end of a field glass or like instrument 7ª either rigidly or removably, in which latter case, the collars are each split as shown and have their opposing ends adjustably secured together by means of thumb screws 13. In either case it is desirable to provide a lining of felt or similar material 14 between each ring and the coöperating portion of the field glass. A stop 15 is located on each collar 7 near the pivots 6 and serves to limit the movement of the frames 5 in one direction. This stop is so located relatively to said pivots 6 as to position the mirror 11 in axial alinement with the tubes of the field glass when the attachment is in operative position as shown in Fig. 1.

In using the attachment the mirror 11 should first be adjusted to stand at such an angle that any image reflected from it will pass through or along the axis of the instrument, after which, by proper adjustment of the mirror 12, the image of the aerial vessel or other elevated object is reflected from this mirror 12 to the mirror 11 and thence through the instrument to the eye of the observer. In this condition of the parts, the object or rather a reflection thereof may be readily and comfortably viewed through the field glasses with but a slight change in the position of the field glasses in a vertical plane. A new adjustment of the position of the mirror 12 will at all times keep the object in view without necessitating the observer to assume an abnormal or uncomfortable position. While it is desirable to have the mirror 11 adjustable, this is not absolutely necessary and said mirror 11 may be fixed at a proper angle to properly reflect images through the instrument to the eye of the observer.

When it is desired to use the glasses without the attachment, that is in the ordinary way, the frames 5 may simply be swung back upon the field glasses and secured in this position by means of the thumb screws 10 or may be moved simply a sufficient distance to remove the mirror 11 from in front of said glasses and then secured as described.

My invention thus provides an attachment which may be rigidly secured on the optical instrument or removably positioned thereon and which in either case may be easily swung to a temporarily inoperative position so as not to prevent ordinary usage of the optical instrument and which when in operative position permits the viewing of objects out of the ordinary visual line in a comfortable and normal manner. My invention is thus particularly adapted for use in connection with the observation of aerial flights or other exhibitions taking place above the line of normal vision.

It is of course to be understood that when the attachment is used with a single tube telescope, only one collar 7 is required, in which case the frames 5 are pivoted at diametrically opposite points of said single collar.

If desired, instead of frictionally mounting the mirrors 11 and 12 on their supports, said mirrors may be mounted to swing freely and securing means, as for instance, thumb screws may be provided for securing said mirrors at any angle.

Various changes in the specific form shown and described may be made within the scope of the claims without departing from the spirit of my invention.

I claim:

1. An attachment for field glasses or like optical instruments comprising a support mounted on said instrument, a mirror carried by said support in line with the optical axis of said instrument and a second mirror carried by said support above the said optical axis, said mirrors being adjustable relatively to each other.

2. An attachment for field glasses or like optical instruments comprising a support mounted on said instrument, a mirror carried by said support in line with the optical axis of said instrument and a second mirror carried by said support above the said optical axis and adjustable relatively to said first-named mirror.

3. An attachment for field glasses or like optical instruments comprising a collar adapted to be removably secured on said instrument, means for securing said collar in position, a frame pivotally mounted on said collar, means for securing said frame in an adjusted position and mirrors mounted on said frame and movable therewith to an operative or an inoperative position, one of said mirrors being adjustable on said frame relatively to the other.

4. An attachment for field glasses or like optical instruments, comprising a collar adapted to be secured on said instrument, a frame pivotally secured to said collar and mirrors carried by said frame and movable therewith to an operative or an inoperative position.

5. An attachment for field glasses or like optical instruments comprising a collar adapted to be secured on said instrument, a frame pivotally secured to said collar, mirrors carried by said frame and movable therewith to an operative or an inoperative position and means for securing said frame in an adjusted position.

6. An attachment for field glasses or like optical instruments comprising a collar adapted to be secured on said instrument, a frame pivotally secured to said collar, mirrors pivotally mounted on said frame and movable therewith to an inoperative position and means for securing said frame in an adjusted position.

7. An attachment for field glasses or like optical instruments comprising a collar adapted to be removably secured on said instrument, means for securing said collar in position, a frame pivotally mounted on said collar, mirrors pivotally mounted on said frame and means for securing said frame in an adjusted position.

8. An attachment for field glasses or like optical instruments comprising a support movably mounted on said instrument, mirrors carried by said support and a stop for limiting the movement of said support so as to position one of said mirrors in line with the optical axis of said instrument.

9. An attachment for field glasses or like optical instruments comprising a support pivotally mounted on said instrument, mirrors pivotally secured on said support and a stop for limiting the movement of said support so as to position one of said mirrors in line with the optical axis of the instrument.

10. An attachment for field glasses or like optical instruments comprising a support movably mounted on said instrument and mirrors carried by said support and movable therewith to a position out of alinement with the optical axis of the instrument.

In testimony whereof, I have hereunto set my hand and seal in the presence of two subscribing witnesses.

LAWRENCE ABRAHAM.

Witnesses:
JOSEPH P. SHEERAN,
FREDERICK W. RONBACK.

---

Copies of this patent may be obtained for five cents each, by addressing the "Commissioner of Patents, Washington, D. C."